(12) United States Patent
Yoshida

(10) Patent No.: US 7,263,439 B2
(45) Date of Patent: Aug. 28, 2007

(54) IMAGE OPERATION SYSTEM

(75) Inventor: Masato Yoshida, Nagoya (JP)

(73) Assignee: DENSO CORPORATION, Kariya (JP)

( * ) Notice: Subject to any disclaimer, the term of this patent is extended or adjusted under 35 U.S.C. 154(b) by 509 days.

(21) Appl. No.: 10/916,509

(22) Filed: Aug. 12, 2004

(65) Prior Publication Data

US 2005/0068296 A1 Mar. 31, 2005

(30) Foreign Application Priority Data

Sep. 25, 2003 (JP) ............................. 2003-333954

(51) Int. Cl.
*G01C 21/00* (2006.01)
(52) U.S. Cl. ...................... 701/200; 701/200; 701/208; 701/209; 340/995.1; 340/995.16
(58) Field of Classification Search ................ 701/200, 701/208–209, 211, 212; 340/990, 995.1, 340/995.16

See application file for complete search history.

(56) References Cited

U.S. PATENT DOCUMENTS 6,763,252 B2 * 7/2004 Itazawa ................... 455/575.1

FOREIGN PATENT DOCUMENTS

JP   A-2003-97964   4/2003

* cited by examiner

*Primary Examiner*—Gertrude A. Jeanglaude
(74) *Attorney, Agent, or Firm*—Posz Law Group, PLC

(57) ABSTRACT

In an image control system, with a reactive force on an input device that controls a pointer in a display, a bilateral communication of a pointing device can prevent a sense of discomfort while the system is used by an operator. When a screen image is switched from an image A to an image B, the pointing device activates the reactive force data for the image B after a predetermined amount of time based on the type or the amount of the image data of the screen image B. This enables the application of the reactive force for the image B in synchronization with generation of the screen image B, and thus gives an appropriate reactive force to the input portion of the pointing device when the screen images are being replaced from the image A to the image B.

10 Claims, 5 Drawing Sheets

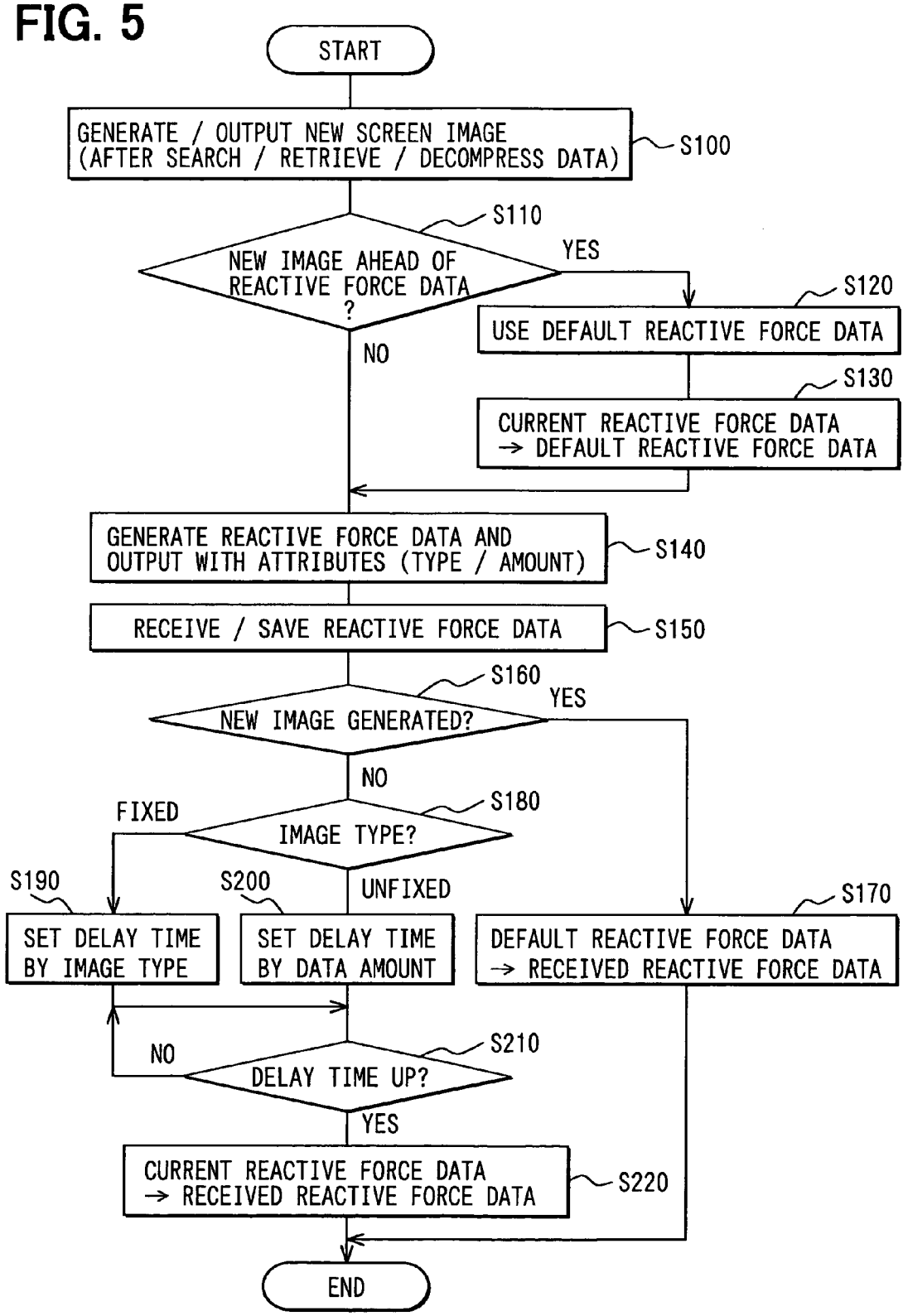

IMAGE OPERATION SYSTEM

CROSS REFERENCE TO RELATED APPLICATION

This application is based on and incorporates herein by reference Japanese Patent Application No. 2003-333954 filed on Sep. 25, 2003.

TECHNICAL FIELD OF THE INVENTION

The present invention relates to an image operation system that displays a pointer in a screen image in a display and variably gives a reactive force to an input operation section of the pointing device according to the displayed location of the pointer.

BACKGROUND OF THE INVENTION

A vehicle navigation system is taken as an example of image operation systems. A user can scroll the map displayed in a display or move a pointer or a button selection cursor in a menu screen by using a remote controller (pointing device) with an input operation section such as a joystick when using this type of vehicle navigation system. When a map scrolls on the display, the map is moved by a predetermined distance in the opposite direction on the instruction signal sent from the remote controller. When selecting a button with a button cursor, the cursor is moved by one button in the signaled direction. When the same signal is sent over a predetermined period of time, the map is scrolled in the same direction successively or the button cursor is moved to the next button successively.

That is, in the vehicle navigation system, a desired operation in a screen image can be achieved when the pointing device such as a remote controller communicates to the vehicle navigation system uni-directionally to send an operational status signal of the pointing device.

On the other hand, for the purpose of operability, a system that has a reactive force on its input operation section according to the display position of a pointer or the like by using a bilateral communication between the pointing device and the vehicle navigation system is becoming close to practical use. That is, a reactive force is applied to the input operation section of the pointing device for the ease of placing the pointer on top of a selection button and the like in the screen image. When the reactive force is introduced, objects in the screen image act according to the Newton's third law of motion, simulating a real world of gravity. For example, the reactive force, when decreasing and then increasing along an X-axis, is integrated as a 'potential' of a drawing force on the pointing device. As a result, the pointing device can comfortably be guided to the bottom of the 'potential' curve, even when arbitrarily operated by an operator. According to this method, the operator can easily place the pointer on top of the area of selection button in the screen image, once the minimum reactive force is placed in the target area.

However, when a bilateral communication like this system is used, the following problem of screen image replacement arises. That is, a reactive force data is formed on a screen image basis to be applied to the input operation section. This reactive force data is outputted from the navigation system to the pointing device according to the screen image to be displayed on a screen. On the other hand, when an image data to generate a screen image is formed in the navigation system and is outputted to the display device, generation of a screen image takes time and a period of generation time varies according to the amount of image data. Therefore, the reactive force being applied to the input operation section and the screen image being displayed does not match and may cause a sense of discomfort to an operator.

SUMMARY OF THE INVENTION

The present invention addresses the foregoing shortcomings in image operation systems and improve such systems. That is, this image operation system utilizes a bilateral communication between a pointing device and a system with an attached display to apply a reactive force to an input operation section of the pointing device, thereby minimizing a sense of discomfort felt by an operator.

The image operation system comprises a display portion that has a screen image, a pointing device with an input operation section that instructs the destination of pointer movements on the screen image with a reactive force based on the reactive force data that relates the reactive force with the location of the screen. The reactive force data is so formed and activated that, regardless of the period of time taken by generation of a screen image, the reactive force suits the condition of the screen image being displayed at the time of operation, and more specifically, the reactive force data being used is selected according to the type of screen image to be displayed.

There are a fixed type and an unfixed type of the screen image depending on the context of the operation. Thus the image operation system switches two types of reactive force data corresponding to the situation, that is, a generated one based on the screen image data and a default one.

In terms of the ease of operation, this invention provides an efficient way of directing a pointer in the screen image. The pointing device of the image control system not only has a functionality of indicating the location of the pointer in the screen image, but also has an enter key equivalent function. In addition, the pointing device has a suitable force feedback based on the reactive force data when selecting a button in the screen image, and that extremely facilitates the ease of use of the system.

BRIEF DESCRIPTION OF THE DRAWINGS

While the appended claims set forth the features of the present invention with particularity, the invention together with its objects and advantages, may be best understood from the following detailed description taken in conjunction with the accompanying drawings, in which:

FIG. 5 shows a functional flow chart of a reactive force data activation procedure in synchronization with the generation of a screen image when a screen image is replaced.

DETAILED DESCRIPTION OF THE PREFERRED EMBODIMENTS

Figure 1:
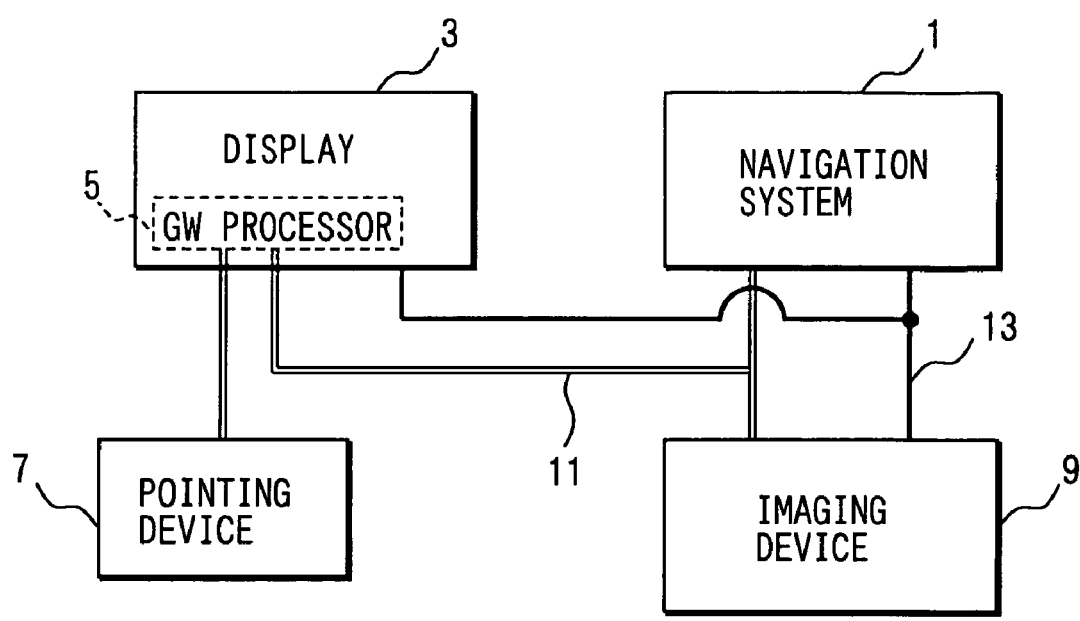
FIG. 1 shows a schematic block diagram of a display operation device according to an embodiment of the present invention.

As shown in FIG. 1, an image operation system according to this embodiment is comprised of a car navigation system (navigation ECU) 1, a display device 3 having a gateway (GW) processor 5, a pointing device 7, and an imaging device 9 having a camera and other devices that take pictures of rear view of a vehicle and the like. Further, the pointing device 7 is connected to the display device 3 and to the navigation ECU 1 via the GW processor 5 by using a dedicated line 11. The pointing device 7 can send an operation signal of its own and can also send the data from the navigation ECU 1. Also, the navigation ECU 1, the display device 3 and the imaging device 9 are all connected with each other through a vehicle LAN 13.

The navigation ECU 1 includes, although not shown, a location detection device, a map data input device, a voice input device, and a controller connected to these devices. Then, the navigation ECU 1 generates a 'vehicle and its surrounding road map' image data that includes an iconized present location of a vehicle. This data is derived from the location detection device and placed on top of the road map data that is formed by the map data input device. The generated image data is then outputted to the display device 3.

The navigation ECU 1 also generates a menu screen image data and outputs it to the display device 3. In this manner, while a menu screen image is outputted and displayed on the display device 3, an input to the menu screen, such as destination facility search, map display condition settings and map scroll condition settings, and the other functionalities of the navigation ECU 1, is accepted by selecting a corresponding button image on the display with the pointer. Upon selection of a menu item, the screen image is replaced with the next one. By iterating selection of a menu item by using the pointer, a desired functionality can be invoked. The navigation ECU 1 generates a various kinds of screen image data corresponding to each functionality and outputs it to the display device 3 in order.

The display device 3 is, for example, composed of a liquid crystal display. It receives screen image data outputted from the navigation ECU 1, and then displays a screen image based on the received screen image data. Also, this display device 3 receives the operation signal from the pointing device 7. The operation signal from the pointing device 7 includes a pointer location signal that indicates the location of the pointer in the screen of the display device 3, and an ON/OFF signal that determines the selection of a menu button and the like. In the display device 3, the display location of a pointer is moved according to the pointer location signal included in the operation signal. Further, the display device 3 receives the image data from the imaging device 9 such as a camera and the like, and the display device 3 generates and displays a screen image based on the image data.

Further, the display device 3 has the GW processor 5, and this GW processor 5 determines the destination of data, for example, determines if the destination of data outputted from the navigation ECU 1 is the display device or the pointing device 7, and transfers the data accordingly as a gateway.

Figure 2:
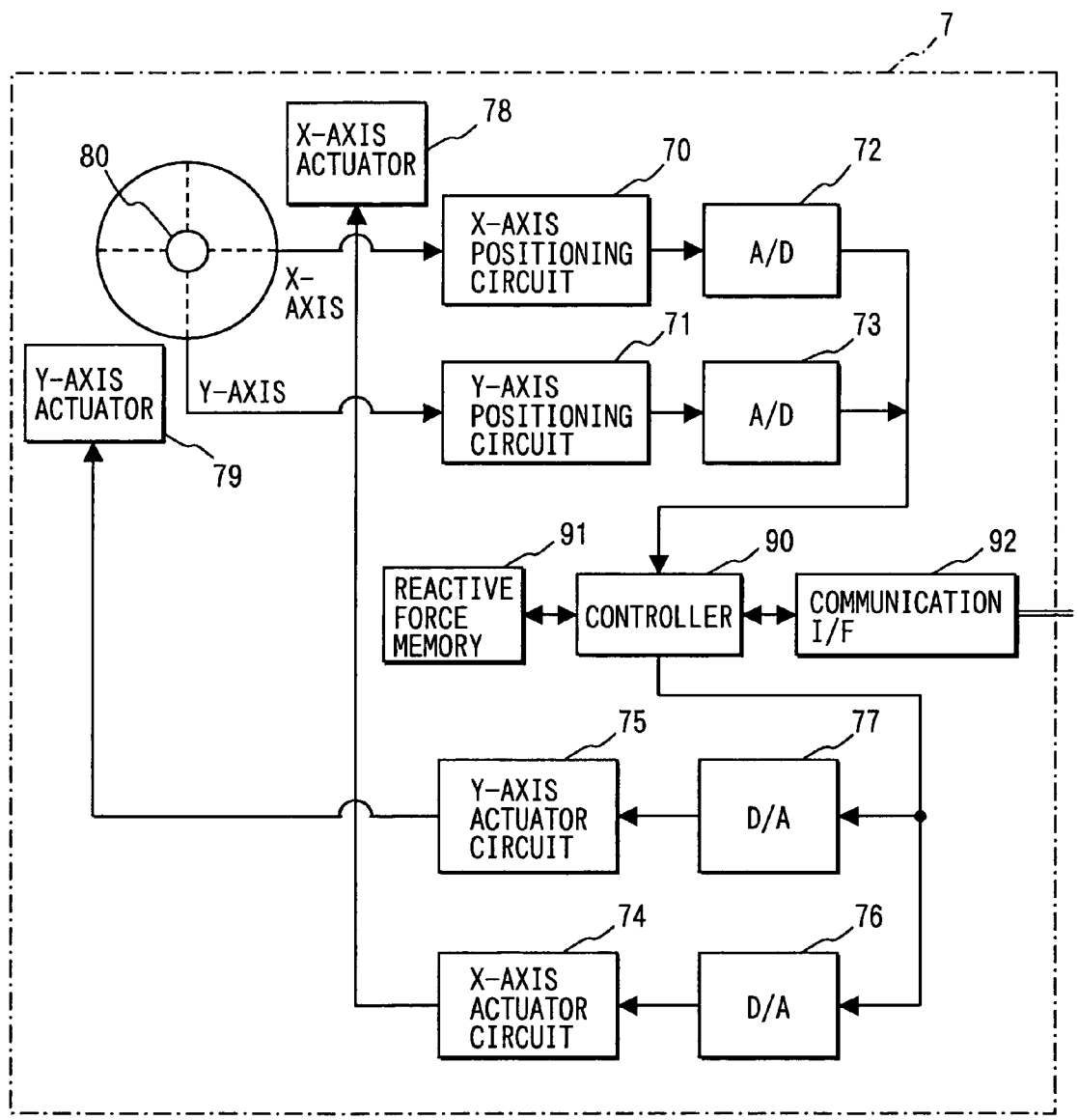
FIG. 2 shows a block diagram of the internal structure of the pointing device according to the embodiment.

The pointing device 7 has a joystick as an input operation section, and, for example, is installed in the proximity of the console box inside the vehicle. FIG. 2 shows a block diagram of internal structure of the pointing device 7. As shown in the figure, the pointing device 7 is composed of an X-axis position signal acquisition circuit 70, a Y-axis position signal acquisition circuit 71, A/D converters 72, 73, an X-axis actuator driving circuit 74, a Y-axis actuator driving circuit 75, D/A converters 76, 77, an X-axis reactive force actuator 78, a Y-axis reactive force actuator 79, and joystick 80. This joystick 80 is operable arbitrarily in two dimensional directions represented by an X-axis and a Y-axis.

Figure 3:
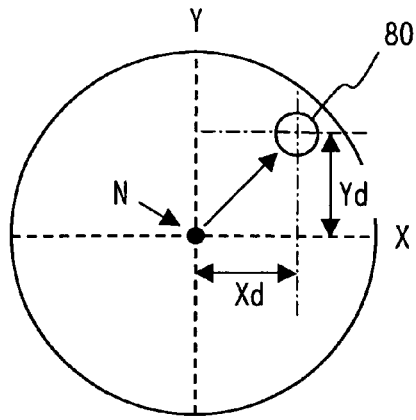
FIG. 3 shows a schematic diagram that depicts the movement of a joystick from the neutral position N by X and Y coordinates according to the embodiment.

The X-axis position signal acquisition circuit 70 acquires an analog signal that represents the amount of movement of the joystick 80 from the neutral point N in the X direction. The Y-axis position signal acquisition circuit 71 acquires an analog signal that represents the amount of movement of the joystick 80 from the neutral point N in the Y direction. For example, as shown in FIG. 3, an operational movement of joystick 80 is measured and acquired by the combination of displacement Xd in X-axis and displacement Yd in Y-axis.

The A/D converters 72, 73 convert the analog signal that represents the amount of movement in X and Y-axis directions to a digital signal, and outputs it to a controller 90.

The D/A converters 76, 77 receive a digital input signal, that is used to create the reactive force applied to the joystick 80 corresponding to the operation on it, from the controller 90 and convert it to the analog signal. The converted analog signal is outputted and sent to the X-axis actuator driving circuit 74 and the Y-axis actuator driving circuit 75 respectively.

The X-axis actuator driving circuit 74 and the Y-axis actuator driving circuit 75 provide driving power for the X-axis reactive force actuator 78 and the Y-axis reactive force actuator 79 based on the analog signal outputted from the D/A converters 76, 77. The X-axis reactive force actuator 78 and Y-axis reactive force actuator 79 generate power of resistance (reactive force) that forces the joystick 80 to return to the neutral position N corresponding to the provided driving power. A stepping motor is, for example, used as an actuator and the actuator is mechanically connected to the joystick 80.

The controller 90 calculates the pointer position displayed on the display device 3 after a transitional movement based on the positional differences of the joystick 80 on each axis derived from the A/D converters 72, 73. Then, the controller 90 calculates the suitable reactive force at the post-transition position to be applied to the joystick 80 based on the reactive force data that is outputted from the navigation ECU 1 and stored in a reactive force data memory 91 with reference to the screen image being displayed.

When the reactive force to be applied to the joystick 80 is calculated in this manner, the controller 90 outputs a digital signal representing the calculated reactive force to the D/A converters 76, 77. The reactive force data is, then, received by the controller 90 via a communication interface (I/F) 92, and stored in the reactive force data memory 91. This reactive force data memory 91 can store multiple reactive force data at the same time. The controller 90 determines which reactive force data among them to be applied to the joystick 80.

Further, the controller 90 sends the coordinate data of the pointer after a transitional movement and an ON/OFF signal from the enter key at the top, or in the proximity of the top, of the joystick 80 to the display device 3 as an operation signal. Then, the display device 3 moves the pointer to the location according to the coordinate data and transfers the operation signal to the navigation ECU 1. The operation signal is transferred to the navigation ECU 1, because of the following two reasons.

The first reason is, when the enter key is ON, the screen image has to be replaced, and thus an image data for the replaced screen image has to be generated in the navigation ECU 1. The second reason is, when the pointer is placed on one of the selection buttons in the screen image, the screen image data has to be updated so that the selection button under the pointer is highlighted.

Figure 4A:
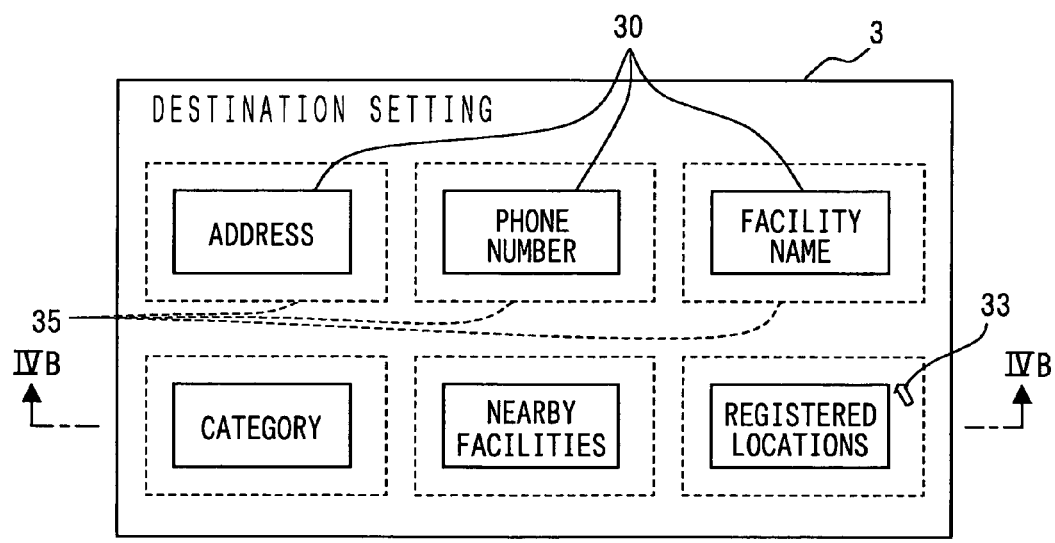
FIG. 4A shows an image diagram taken as an example of destination setting menu.
Figure 4B:
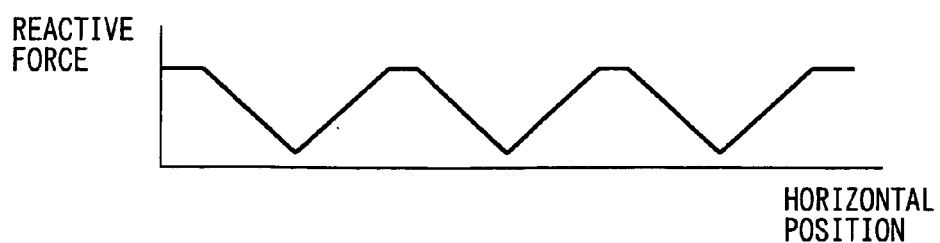
FIG. 4B shows a reactive force characteristics taken along the 4B—4B line.

The reactive force data is described using FIG. 4A, 4B as examples at this point. As shown in FIG. 4A, in the destination setting menu screen image, the display device 3 displays destination setting method selection buttons 30 to be chosen from. In this case, the reactive force data is set to draw the pointer 33 into the displayed image area of the selection buttons 30 when the pointer 33 approaches to the selection buttons 30. That is, a drawing reactive force area 35, that covers the selection button and its proximity as shown in FIG. 4A, is set around each selection button 30. FIG. 4B shows changing state of the actual reactive force. In this figure, the reactive force data is described as in one dimensional change taken along the 4B—4B line instead of two dimensional change in reality for the simplicity of description.

FIG. 4B shows the reactive force data setting, that is, when the pointer 33 is outside of the drawing reactive force area 35, the reactive force is at its maximum strength. The closer to the center of the selection button 30 the pointer 33 approaches, the weaker the reactive force becomes. Therefore, as already described in the BACKGROUND OF THE INVENTION section, the joystick 80 is easily operable to guide the pointer 33 approaching from the periphery of the selection button 30 to the center of it.

The characteristics of the present embodiment is described based on the functional flow chart of the image operation system in FIG. 5, that is, reactive force data synchronization process that activates the corresponding reactive force data of the screen image in synchronization with the generation of the replaced screen image under the screen image replacement instruction. This process is executed when, for example, as a result of selecting a selection button in a menu screen image, replacement of the present screen image with the search screen image, the search result screen image, or the like is instructed, by the pointing device 7. Also, replacement of the screen images can be instructed by using a touch switch or a mechanical switch that is built into the display device 3 other than the pointing device 7.

Firstly, in step S100, the navigation ECU 1 generates and outputs the image data of the replaced screen image. For example, a fixed format screen image such as a menu screen image can be retrieved and outputted from a formed and stored image data. Further, when a search result screen image is required, a screen image data is generated and outputted after a data search and retrieval with necessary processes such as decompression of the retrieved data.

In step S110, the navigation ECU 1 determines if generation of a screen image to be displayed completes before full reception of the reactive force data by the pointing device 7 because of the smallness of the size of the data. That is, in the step S110, whether generation of a screen image completes earlier than full reception of the reactive force data is determined based on the type and the amount of the screen image. The process of this step S110 starts when the type and the amount of the screen image data to be displayed is revealed, and is carried out in parallel with the processes in step S100 such as retrieval of the screen image data and decompression of the data.

If Yes in step S110, the navigation ECU 1 makes the pointing device 7 use the default reactive force data in step S120. Based on this instruction, the pointing device 7 replaces the type of the reactive force data to be activated from the one corresponding to the pre-replacement screen image to default one in step S130.

The default reactive force data may, in this case, have an even distribution of the reactive force over the entire screen image, or may have a different pattern of reactive force data in order to be applied to a simple screen image that can be generated in a short time. This default reactive force data is stored in the reactive force memory 91 in the pointing device 7 beforehand. Further, the reactive force data corresponding to the pre-replacement screen image may be used as the default data as it is.

In step S140, the navigation ECU 1 generates the reactive force data corresponding to the replaced screen image, and sends it with the screen image type or the amount of the screen image data to the pointing device 7. Moreover, the processes in the steps S110 to S140 are carried out in parallel with the process in step S100. In step S150, the pointing device 7 receives the reactive force data and the screen image type or the amount of the screen image, and the reactive force data is stored in the reactive force data memory 91.

In step S160, the pointing device 7 determines whether generation of a screen image is completed or not based on the received screen image type or the amount of the received image data. If "Yes", the process proceeds to step S170, and the pointing device 7 replaces the default reactive force data with the received reactive force data. On the other hand, if "No" in step S160, the process proceeds to step S180. In step S180, whether the received screen image is a fixed format screen image such as a menu screen or an unfixed format screen image such as a search result display screen image is determined.

Then, if the screen image is determined as a fixed format, the process proceeds to S190 and sets a delay time from the reception of the reactive force data to the activation of the reactive force data depending on the type of the fixed format screen image. The fixed format screen image has a predictable generation period of time, and the delay time is set to be in synchronization with completion of the screen image generation.

If, on the contrary, the screen image is determined as an unfixed format, the process proceeds to the step S200, and the delay time is set based on the amount of the image data. For example, when a search result screen image is displayed after searching for a destination facility, the number of facility that fulfills the search condition varies significantly. Thus generation time of the screen image is not predictable. Under the circumstances, an unfixed format screen image has the delay time that corresponds to the amount of the image data. However, both a fixed format screen image and an unfixed type screen image may have the delay time based on the amount of the image data.

In step S210, the pointing device 7 determines whether the delay time set in step S190 or S200 has passed or not. When elapsed time is considered to reach the set delay time, the process proceeds to step S220 and the reactive force data for the pre-replacement screen image is replaced with the reactive force data that corresponds to the replaced screen image.

The processes described above, when a screen image is replaced, can synchronize the activation time of the reactive force data with completion of the screen image generation, or at least can apply the reactive force based on the default reactive force data in case that the generation of a screen image completes earlier, a sense of discomfort to the operator can be minimized in the pointing device 7 operation.

Figure 6:
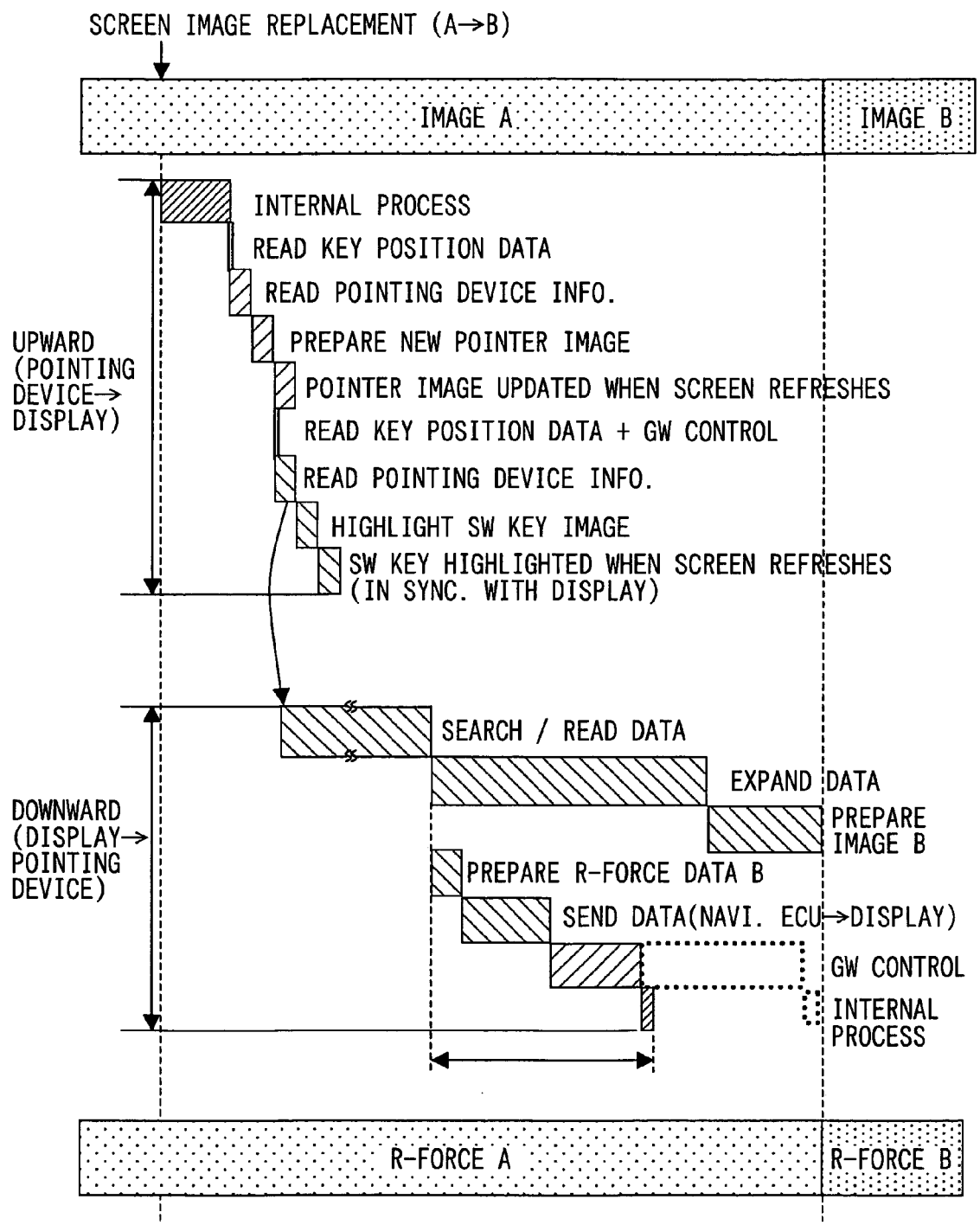
FIG. 6 shows a time chart that depicts every step of display switching processes in time series.

Next, image replacement processes are described by using a time chart shown in FIG. 6. The time chart in FIG. 6 shows an example of image replacement from a search condition screen image (screen image A) to a search result display screen image (screen image B).

As shown in FIG. 6, when an image replacement from screen image A to screen image B is indicated by the enter key by using the pointing device 7, an internal process of the pointing device 7 is carried out. The internal process ensures the input from the enter key by multiple samplings of the enter key state in a predetermined interval.

If all of the sampled states of the enter key are ON, the enter key operation is positively confirmed as ON. Then, the data signal of enter key ON state and the coordinates of the pointer location are sent to the display device 3, whereupon an internal ECU of the display device 3, for example, receives the data signal from the pointing device 7 in synchronization with the update cycle of screen image generation (refreshing of the screen image). Then, a screen image with the updated pointer location is generated based on the coordinate data of the pointer location in the received data signal. This prepared image data is used at the next update cycle of screen image generation to display a screen image with the updated pointer location, and, as a result, update of the pointer location completes.

The display device 3 sends the data signal from the pointing device 7 with gateway processes to the controller of the navigation ECU 1 in synchronization with the screen image generation of updated pointer location. Then, the navigation ECU 1 retrieves the data signal from the pointing device 7 in synchronization with the above update cycle of screen image generation. An image data in order to generate a screen image with the highlighted selection button being selected by the enter key is formed (SW[software] key highlighting process). This image data at the next update cycle of screen image generation (refreshing of the screen image) generates a screen image on the display device 3, and that completes the screen image with the highlighted selection button.

The above processes are carried out under the instruction of the data signal sent from the pointing device 7 to the display device 3. According to these processes, the pointer will be displayed at the post-transition location in approximately 100 ms after the operation of the joystick 80, and the selected button will be highlighted in several dozen milliseconds after that.

When an image replacement instruction is received by the navigation ECU 1, it searches for a necessary data to generate a replaced screen image and then retrieves the searched data. Upon completion of the searched data retrieval, a screen image to be displayed is identified. Thus a reactive force (denoted as 'R-Force' in FIG. 6 hereinafter) data B corresponding to the screen image B is generated. Further, decompression (or expansion) of the retrieved image data is carried out in parallel with generation of the reactive force data B.

When the amount of the data to be displayed is large, the reactive force data B is received by the pointing device 7 before completion of decompression (or expansion) and generation (or preparation) of the image data B as shown in FIG. 6. That is, the reactive force data B, after being generated (or prepared), is transferred from the navigation ECU 1 to the display device 3. Then, it is received by the pointing device 7 after a gateway process at the GW processor 5. However, the reception of the reactive force data B might be earlier than the completion of screen image B generation in the display device 3 by couple of hundreds ms.

Therefore, the pointing device 7 uses the reactive force data A corresponding to the screen image A until generation of the screen image B completes even after receiving the reactive force data B corresponding to the screen image B. Then, when elapsed time reaches the delay time of the screen image B generation, the reactive force data A is replaced with the reactive force data B. In this manner, the pointing device 7 activates the reactive force data B in synchronization with generation of the screen image B. In addition, it retains the screen image A by the time of completion of generation of the screen image B. It further retains the reactive force data A corresponding to the screen image A until completion of generation of the screen image B. In this manner, the screen image B and the reactive force data B can be matched seamlessly so that sense of discomfort of an operator can be effectively decreased.

The screen image data and the reactive force data are formed and stored in advance for a fixed format screen image such as a menu screen. Therefore, screen image data and the reactive force data retrieval can be started in parallel upon instruction of the screen image switching. Thus both of them are outputted when the retrieval completes.

While the invention has been particularly shown and described with reference to the preferred embodiments thereof, it will be understood by those skilled in the art that various changes in form and details may be made without departing from the spirit and scope of the invention. In the above embodiment, when a map image is displayed in the navigation ECU 1, the pointer, for example, may be displayed at the center of the map image, and a reactive force may be applied to the joystick 80 of the pointing device 7 during map scroll. In this case, a reactive force data that has a lower reactive force while the pointer is on a road may be formed to guide the pointer to stay within the road, for example, or the reactive force may set to be proportional to the elevation of a map, or the reactive force may reflect the congested condition of a road in the mapped area.

Further, when not only the navigation ECU 1 but also the imaging device such as other camera generates an image data, the reactive force may be adjusted according to an intended rule while the pointer is displayed in the screen image.

What is claimed is:

1. An image operation system comprising:
    a display portion that has a screen image;
    a pointing device with an input operation section that instructs destination of pointer movements on the screen image with a reactive force based on reactive force data that relates the reactive force with a location of the screen; and
    a data output means that displays the screen image for the display portion and, at the same time, outputs the reactive force data according to the screen image data, wherein:
    the pointing device has a reactive force data synchronization means that activates, when a first screen image with a first reactive force data is replaced with a second screen image, a second reactive force data in accordance with generation of a second screen image in the display portion after receiving the second reactive force data corresponding to the second screen image.

2. An image operation system according to claim 1, wherein:
the display portion retains the first screen image until completion of the generation of the second screen image under a replacement instruction of the screen images from the first screen image to the second screen image, and
the pointing device retains and uses the first reactive force data that corresponds to the first screen image until completion of generation of the second screen image after receiving the second reactive force data corresponding to the second screen image.

3. An image operation system according to claim 1, wherein:
the reactive force data synchronization means delays the activation of the second reactive force data by a predetermined amount of time according to the type of the second screen image after receiving the second reactive force data.

4. An image operation system according to claim 1, wherein:
the reactive force data synchronization means delays the activation of the second reactive force data by a predetermined amount of time according to the amount of the second screen image data when receiving the second reactive force data.

5. An image operation system according to claim 1, wherein:
the reactive force data synchronization means uses a default reactive force data before the second reactive force data is being fully retrieved in case that generation of the second screen image is prior to reception of the second reactive force data.

6. An image operation system according to claim 1, wherein:
the input operation section of the pointing device moves the pointer on the screen image in multiple directions in a two dimensional image plane of the screen image.

7. An image operation system according to claim 1, wherein:
the pointing device has screen image replacement instruction means that directs a replacement of the first screen image with the second screen image.

8. An image operation system according to claim 1, wherein:
the data output means outputs the screen image data with at least one selection item to be displayed in the display portion, and
the reactive force data is mapped around a displayed image area of the selection item with the reactive force decreasing towards the displayed image area of the selection item.

9. An image operation system according to claim 1, wherein:
a pointing device with an input operation section that both receives input operation force to instruct a pointer location, and gives force feedback generated by an X-axis reactive force actuator and Y-axis reactive force actuator controlled by a reactive force data of a corresponding screen image displayed in the display portion of the image operation system in order to facilitate the ease of use of the image operation system and to further minimize discomfort during operation of the pointing device.

10. A method of replacing a reactive force data in synchronization with replacement of screen images that is used in an image operation device for a display, the method comprising steps of:
using a default reactive force data by a pointing device before replacing the default reactive force data with a received reactive force data in synchronization with display of a screen image if generation of the screen image completes earlier than the full reception of corresponding reactive force data by the pointing device; and
delaying replacement of screen images by the time when the received reactive force data can be used in synchronization with the generated screen image if generation of the screen image completes later than the full reception of corresponding reactive force data by the pointing device.

* * * * *